United States Patent [19]
Van der Gaag

[11] 3,730,402
[45] May 1, 1973

[54] HOPPER CRAFT

[75] Inventor: Cornelis Van der Gaag, Delft, Netherlands

[73] Assignee: N.V. Industrieele Handelscombinatie Holland, Rotterdam, Netherlands

[22] Filed: June 10, 1971

[21] Appl. No.: 151,738

[30] Foreign Application Priority Data

June 10, 1970 Netherlands ....................... 7008447

[52] U.S. Cl. ................................................ 222/561
[51] Int. Cl. ............................................ F16k 51/00
[58] Field of Search ..................... 251/144, 145, 154; 222/510, 561, 564, 246

[56] References Cited

UNITED STATES PATENTS

| | | | |
|---|---|---|---|
| 3,556,469 | 1/1971 | Bager | 251/144 |
| 1,740,319 | 12/1929 | Stancu, Jr. | 251/144 X |

Primary Examiner—Stanley H. Tollberg
Attorney—Young & Thompson

[57] ABSTRACT

A hopper craft has a cargo space and a plurality of discharge openings in the bottom of the cargo space each of which is opened and closed by a vertically movable valve. Bulkheads extend across the cargo space between the discharge openings; and each valve has an upright plate that is perpendicular to and guided in the bulkheads. On one side of the upright plates, the bulkheads have passages therethrough for pumping out the cargo instead of discharging the cargo by moving the valves vertically. Vertically swinging plates are pivoted to the side wall of the cargo space on the same side as those through passages. In their upwardly swung positions, the latter plates cooperate with the first-mentioned plates to close off the through passages when carrying a cargo that is to be pumped. The vertically swinging plates can then be swung down when the cargo is to be pumped. If the cargo is to be discharged through the valves, however, then the vertically swinging plates are maintained in their down position during loading so that all the cargo space is available.

6 Claims, 3 Drawing Figures

PATENTED MAY 1 1973　　　　　　　　　3,730,402
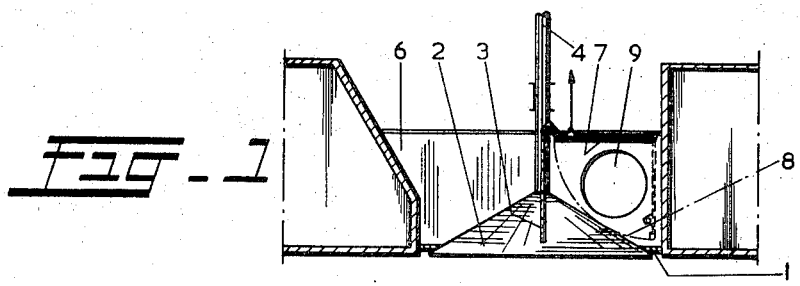
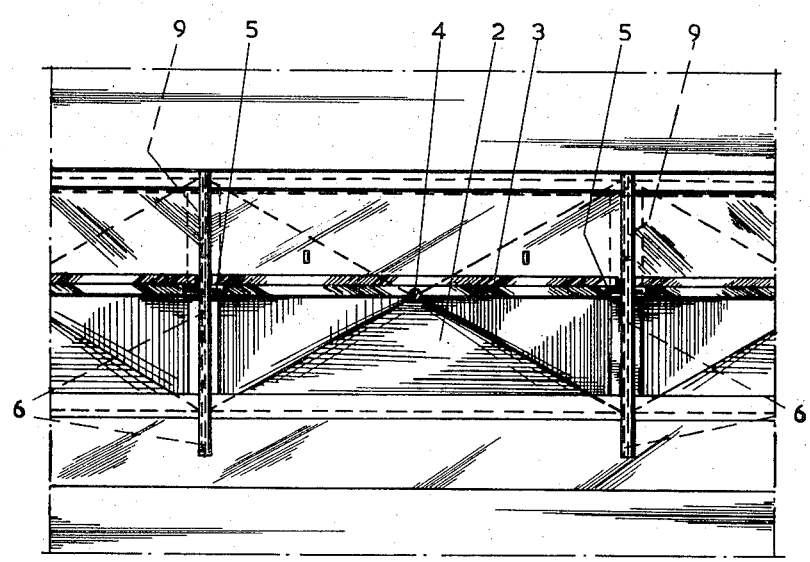
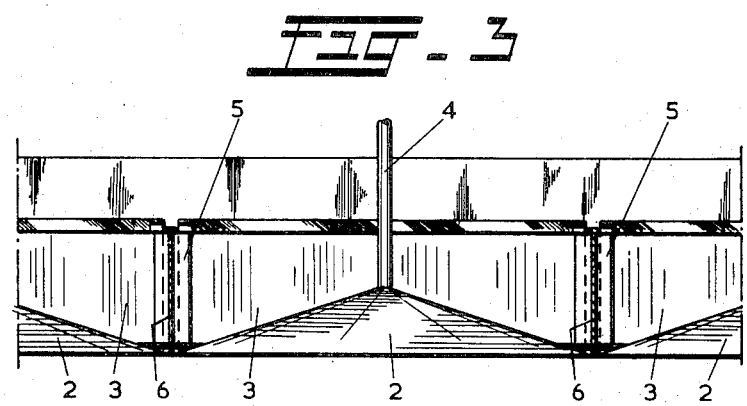

HOPPER CRAFT

The invention relates to a hopper craft fitted with a number of discharge openings in the bottom of the cargo space, each of which is adapted to be closed and opened respectively by a vertically movable valve and has a bottom passage which, through a number of valves to be opened may be connected with the cargo space in order to empty said cargo space.

Such a hopper craft is known from the Dutch patent No. 100,827.

In this known hopper craft, the discharge openings are closed by vertically movable valves which are connected with valve members which close the bottom passage. The disadvantage of this arrangement is that the bottom passage is never available as cargo space, even if it is known in advance that the cargo will not have to be pumped out of the vessel.

Said disadvantage may be obviated according to the present invention by the fact that each vertically movable valve is provided with an upright plate which extends with its vertical edges in guide means fitted to the bulkheads of the cargo space and which, at the site of its top part, cooperates with a valve member which, in the closed position, shuts off the bottom passage from the cargo space, which passage, seen in cross-section, is bounded by the upright plate, the valve and a side wall of the cargo space, which valve, in the open position, bears against a side wall of the cargo space.

Owing to the fact that the vertically movable valve is guided in its vertical movement by the upright plate, each of the discharge openings may be given a substantially rectangular sectional shape, whereby the valve may have two faces which taper off towards the side walls of the cargo space. In this manner there are obtained discharge openings, the surface of which is comparably greater than the surface of the circular discharge openings known from the aforementioned Dutch patent specification.

The valves closing the discharge openings are preferably pyramidical in shape.

The invention will now be explained in more detail with reference to the annexed drawing.

FIG. 1 shows a diagrammatic cross-sectional view through a part of the cargo space with a discharge opening of a hopper according to the invention.

FIG. 2 is a top elevational view of FIG. 1.

FIG. 3 is an elevational side view of FIG. 2.

FIG. 1 shows a part of the bottom of the cargo space of a hopper craft shown with a discharge opening 1, which is closed by the vertically movable valve 2. The valve 2 has the form of a pyramid to which an upright plate 3 has been attached, which has also been attached to the valve stem 4 by welding. The upright plate 3 extends with its vertical edges in guide means 5, which are attached to the bulkheads 6. The plate 3 is deflected at its top part into the form of a steeple, so that the horizontal upper edge of the plate is adapted to cooperate with the valve member 7, which is attached to a side wall with a hinged connection. The valve member 7 may be moved in an upward and a downward direction by a mechanism, not shown in the drawing. In the position shown in FIG. 1, the valve 7 closes a bottom passage 8 which, by means of the openings 9 in the bulkheads 6, forms a continuous passage over the length of the vessel, which passage, at one end of the vessel is connected with a pump. If it is known in advance that the cargo carried by the vessel will have to be pumped out of the cargo space, the valve 7 is placed in its shown position before the hopper craft is loaded.

After the vessel has been loaded, the valves 7 are opened by moving them downwardly into the position indicated with broken lines in FIG. 1, whereupon the cargo may be pumped up from the cargo space through the bottom passage 8 by means of the pump, not shown in the drawing. However, if it is known in advance that the cargo will be discharged by means of the valve 2, the valve member 7 will be maintained in its downward position, so that the entire cargo space may be utilized for the loading of cargo.

According to the invention there has been provided a very effective discharge system in which by means of providing the vertical plate 3 there has been created a very simple bottom passage as well as a guiding means for the valve 2, so that said valve may be given a substantially rectangular, horizontal sectional shape, since the valve is locked against rotation.

I claim:

1. A hopper craft having a cargo space bounded by side walls, a plurality of bulkheads extending transversely across the cargo space between the side walls, discharge openings at the bottom of the cargo space between the bulkheads, a vertically movable valve for opening and closing each discharge opening, the valves having upright plates thereon that extend between and are guided for vertical movement between the adjacent bulkheads, the bulkheads having passages therethrough on one side of the upstanding plates thereby to define a bottom passage through which cargo may be pumped, and valve means carried by the hopper craft and movable between two positions, said valve means in one of said positions cooperating with said upright plates to close said bottom passage from above, and said valve means in the other of said positions opening said bottom passage from above.

2. A hopper craft as claimed in claim 1, said valve means in said other position resting against a side wall of the cargo space.

3. A hopper craft as claimed in claim 1, said valve means comprising vertically swinging plates carried by a side wall of the cargo space and bridging across the cargo space between said side wall and said upright plates in said one position and hanging downward in said other position.

4. A hopper craft as claimed in claim 1, said discharge openings being substantially rectangular and said vertically movable valves being substantially rectangular.

5. A hopper craft as claimed in claim 4, said vertically movable valves having downwardly inclined upper surfaces.

6. A hopper craft as claimed in claim 5, said vertically movable valves being pyramidal in shape.

* * * * *